United States Patent [19]
Krehl et al.

[11] Patent Number: 5,450,815
[45] Date of Patent: Sep. 19, 1995

[54] MANURE SCRAPER ASSEMBLY WITH OPPOSINGLY ANGLED BLADES

[75] Inventors: Michael E. Krehl, Corunna; Larry Dowty, Syracuse, both of Ind.

[73] Assignee: CTB, Inc., Milford, Ind.

[21] Appl. No.: 202,358

[22] Filed: Feb. 28, 1994

[51] Int. Cl.⁶ .................... A01K 1/01; A01K 31/04
[52] U.S. Cl. ........................ 119/28; 119/22; 15/93.3; 15/93.4
[58] Field of Search ............ 119/22, 21, 15, 20, 119/28, 161; 15/93.1, 93.4, 93.3; 198/737, 743, 744, 749

[56] References Cited

U.S. PATENT DOCUMENTS

| | | | |
|---|---|---|---|
| 2,264,939 | 12/1941 | Hawkins | 119/22 |
| 2,383,326 | 8/1945 | Lovell | 119/22 |
| 2,970,567 | 2/1961 | Rubin | 119/22 |
| 4,320,008 | 3/1982 | Kokubo | 119/22 |
| 4,335,681 | 6/1982 | Holland | 119/22 |
| 4,489,675 | 12/1984 | Siciliano | 119/22 |

FOREIGN PATENT DOCUMENTS

| | | | |
|---|---|---|---|
| 714288 | 8/1954 | United Kingdom | 119/22 |
| 1044893 | 10/1966 | United Kingdom | 15/93.3 |
| 650572 | 3/1979 | U.S.S.R. | 119/28 |

*Primary Examiner*—Todd E. Manahan
*Attorney, Agent, or Firm*—Trexler, Bushnell, Giangiorgi & Blackstone

[57] ABSTRACT

A scraper assembly for clearing manure deposits from a manure collection board associated with an animal cage arrangement includes a first scraper blade extending in a generally diagonal direction with respect to a length of the collection board, but only partially across a width of the collection board, in an area of maximum manure deposits. The scraper assembly further includes a second scraper blade extending in a substantially opposite generally diagonal direction with respect to the diagonal extension of the first scraper blade. The second scraper blade, however, extends substantially across the entire width of the collection board. The first and second scraper blades are supported by a support frame capable of maintaining the generally diagonal opposite orientations of the two blades, and the support frame is driven by a driver which initially advances the scraper blades in a forward direction along the length of the collection board at which time the first scraper blade clears the area of maximum deposit on the board. The driver subsequently moves the support frame and the scraper blades in a reverse direction during which time the second scraper blade clears any remaining manure deposits from the entire width of the collection board.

7 Claims, 3 Drawing Sheets

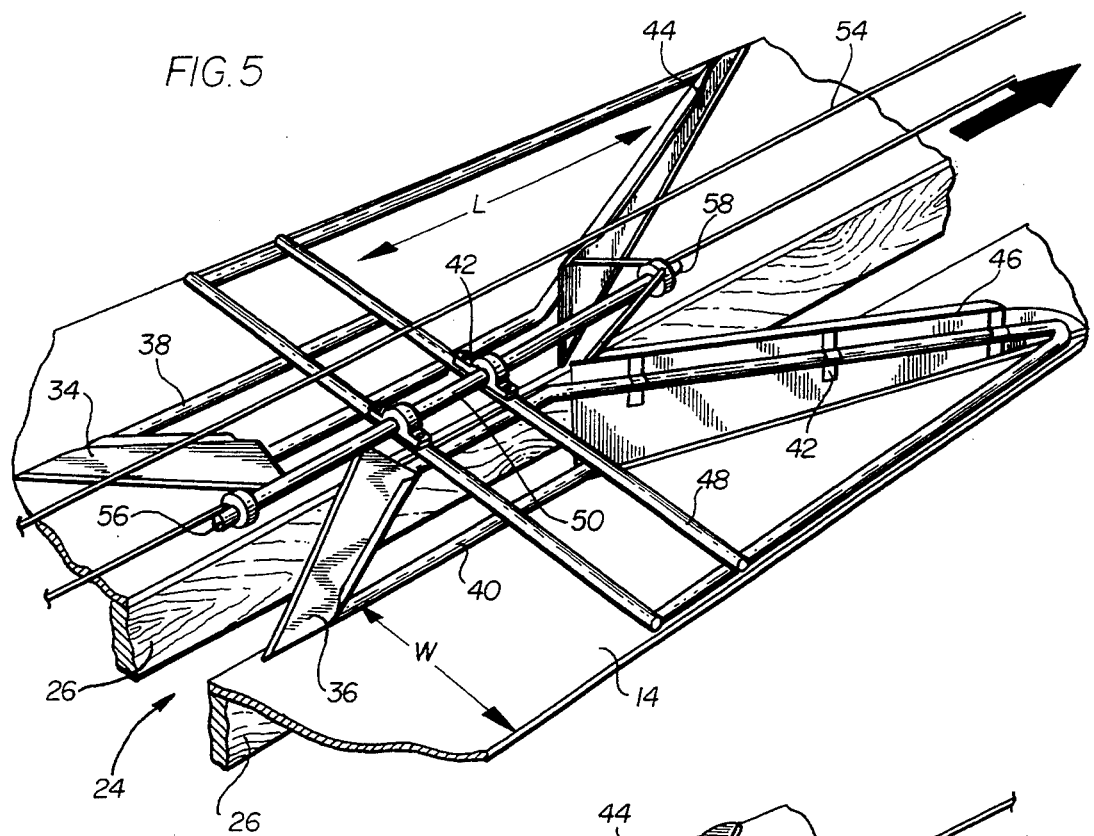
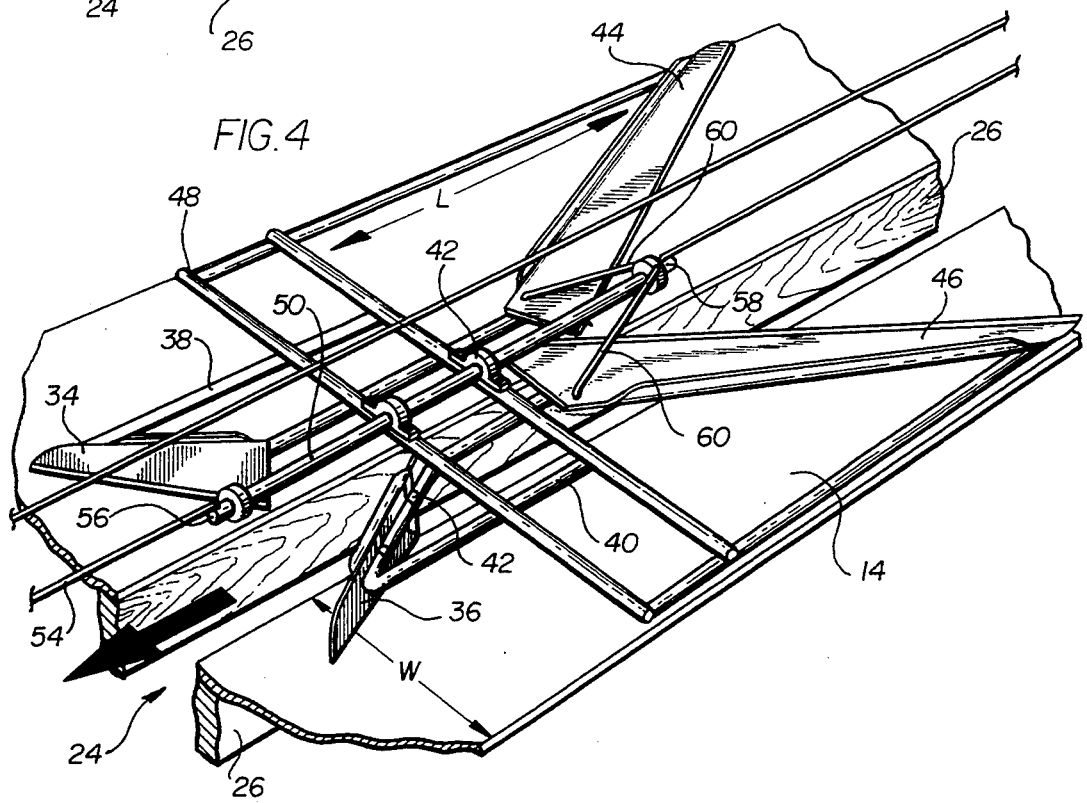

MANURE SCRAPER ASSEMBLY WITH OPPOSINGLY ANGLED BLADES

BACKGROUND OF THE INVENTION a. Field of the Invention

In general, the present invention relates to a system for removing manure from a deposit area. More specifically, the present invention relates to a scraper assembly for removing manure from one or more collection boards located below a cage arrangement, usually found within a commercial egg laying house.

b. Description of Related Prior Art

Manure collection and control presents a number of problems in the commercial egg production industry. In an egg laying operation, for example, the collection and control of manure generated from multi-tiered cage arrangements, which can extend for several hundred feed, is critical to a successful operation.

One manner of collecting manure in a poultry operation is to direct the manure deposits falling from the individual cages within the multi-tiered cage configuration into a accumulation pit located beneath a main floor in the laying house. In order to better control the entry of the manure into the sub-floor accumulation pit, however, it has proved to be advantageous to first collect the cage manure deposits onto collection boards located below the cage arrangement, but above the accumulation pit.

Once the manure has been collected onto the collection boards, it can then be scraped from the boards into a relatively narrow slot formed between the boards which leads to the sub-level accumulation pit.

Automated scraper assembles to transfer the manure from the collection boards to the sub-level pit have, in the past, included a blade spanning the entire width of the board mounted on a frame which, when driven along the board, functions to scrape and direct manure toward the floor slot. If this arrangement is used to clear a collection board having any more than a relatively small amount of manure present on the collection board, however, the scraping action of the blade across the entire width of the board tends to collect too much manure to divert into the floor slot, and thus creates clogging problems.

OBJECTS AND SUMMARY OF THE INVENTION

It is a general objective of the present invention to provide an improved manure removal system.

It is a more specific objective to provide an improved scraper assembly for clearing and directing manure from a collection board into an accumulation pit.

It is an associated objective to provide an improved scraper assembly which includes a first, shorter blade designed to scrape an area of concentrated manure build-up from a collection board during a forward operation of the assembly, and a second, longer blade designed to scrape substantially the entire width of a collection board during a reverse operation of the assembly.

It is a further objective to provide an improved scraper assembly which includes more than one pair of shorter and longer blades, multiple pairs being generally opposed to one another in sets and having individual blades within the sets offset with respect to a lengthwise direction of the collection boards.

Other objects and advantages of the invention will become apparent upon reading the following detailed description, and upon reference to the drawings. Throughout the description, like referenced numerals refer to like parts.

Summarily stated, the present invention relates to a scraper assembly for clearing manure deposits and other debris from a collection board associated with an animal cage arrangement, the scraper assembly comprising a first scraper blade extending in a generally diagonal direction with respect to a length of said collection board but only partially across a width of said collection board in a maximum deposit area, a second scraper blade extending in a substantially opposite generally diagonal direction with respect to the diagonal extension of the first blade and across substantially the entire width of the collection board, a support frame for maintaining said generally diagonal extensions of said first and second scraper blades, and a driver connected to the support frame for initially advancing the scraper blades in a forward direction along the length of the collection board during which time the first scraper blade clears said maximum deposit area of the collection board, and subsequently for retreating said scraper blades in a reverse direction during which time the second scraper blade clears substantially the entire width of the collection board.

BRIEF DESCRIPTION OF THE DRAWINGS

The features of the present invention which are believed to be novel are set forth with particularity in the appended claims. The organization and manner of operation of the invention together with further objects and advantages thereof may best be understood by reference to the following description taken in connection with the accompanying drawings, in which:

FIG. 4 is a fragmented, perspective view illustrating the scraper assembly as it progresses in a forward direction along the collection boards; and FIG. 5 is another fragmented, perspective view, similar to FIG. 3, but illustrating the scraper assembly retreating in a reverse direction along the collection boards.

DETAILED DESCRIPTION OF THE PREFERRED EMBODIMENT

While the invention will be described in connection with a preferred embodiment, it will be understood that it is not intended to limit the invention to that embodiment. On the contrary, it is intended to cover all alternatives, modifications or equivalents as may be included within the spirit and scope of the invention.

Accordingly, it should initially be noted that the illustrated manure removal system of the present invention is shown to include a scraper assembly 10 designed to simultaneously clear manure 12 from a pair of longitudinally extending collection boards 14. If desired, however, the invention could be modified by one having ordinary skill in the art to operate on only a single collection board 14, or more than a pair, at various locations within a cage arrangement, in essentially the same manner as will be described below.

Figure 1:
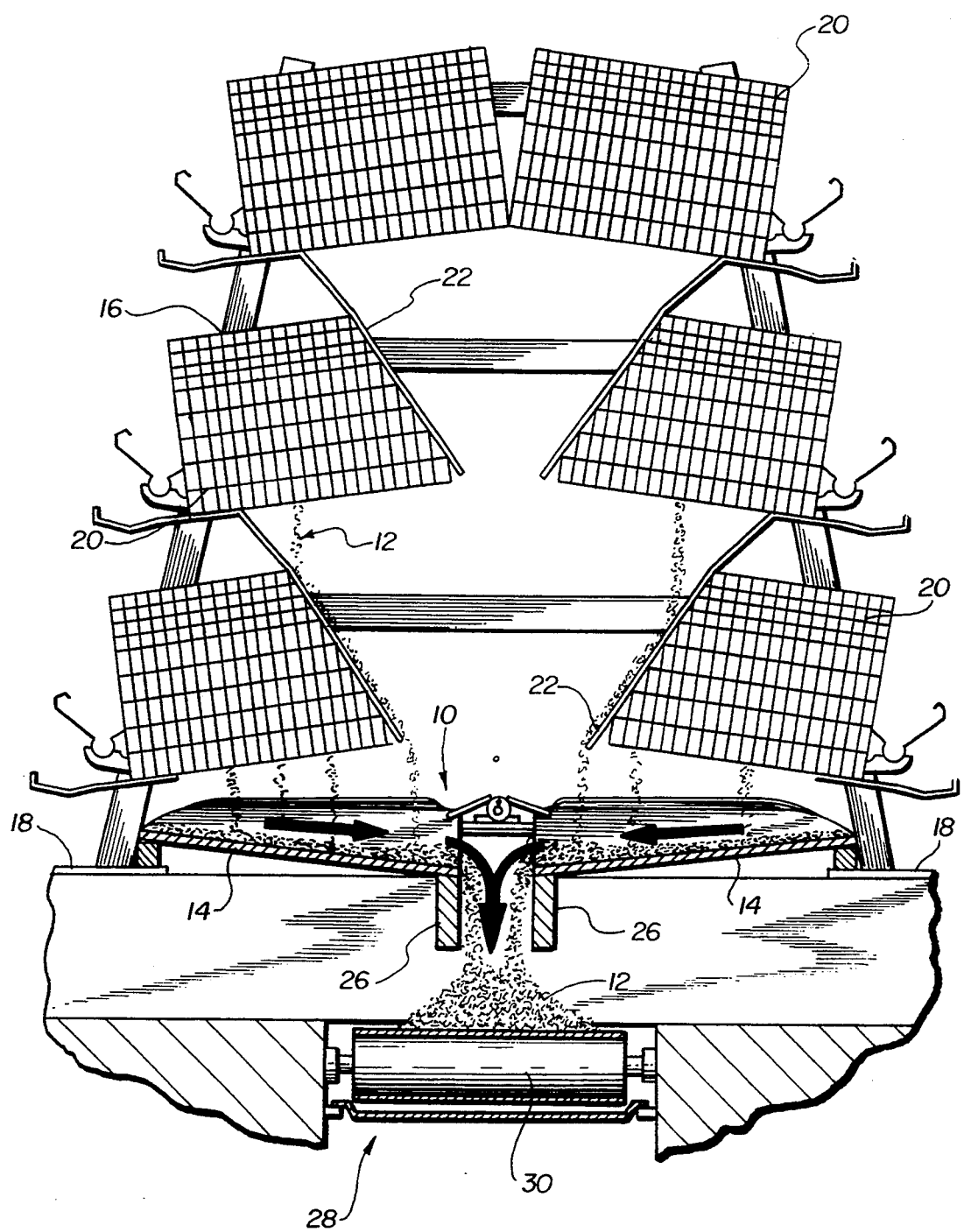
FIG. 1 is an end elevational view of an animal cage arrangement with the scraper assembly of the present invention shown in operative association with a manure collection boards located beneath the lowest tier of cages in a cage arrangement.

In FIG. 1, there is shown a cage arrangement 16 for housing poultry or other animals. The cage arrangement is supported by a floor structure 18, such as would be found in a poultry laying house. The cage arrangement 16 and floor structure 18 may both extend several hundred feet in length. As illustrated, individual cages 20 forming the arrangement 16 are positioned in tiers, the lower rows of which are provided with cage curtains 22 to prevent manure deposits 12 falling from the cages 20 above from entering the cages situated below. Alternatively, multiple collection boards 14 could be positioned below the multiple tiers of cages, and provided with a scraper assembly, as described below.

In the example as shown, however, the floor structure 18 is interrupted and replaced with a single pair of collection boards 14 extending generally parallel to each other and being pitched toward and separated by a floor slot 24. The slot 24 is extended downward by vertical side walls 26 into an accumulation pit 28, located below the floor 18. The accumulation pit 28 preferably includes a conveyor 30 for handling the manure 12 deposited through the slot 24.

Figure 2:
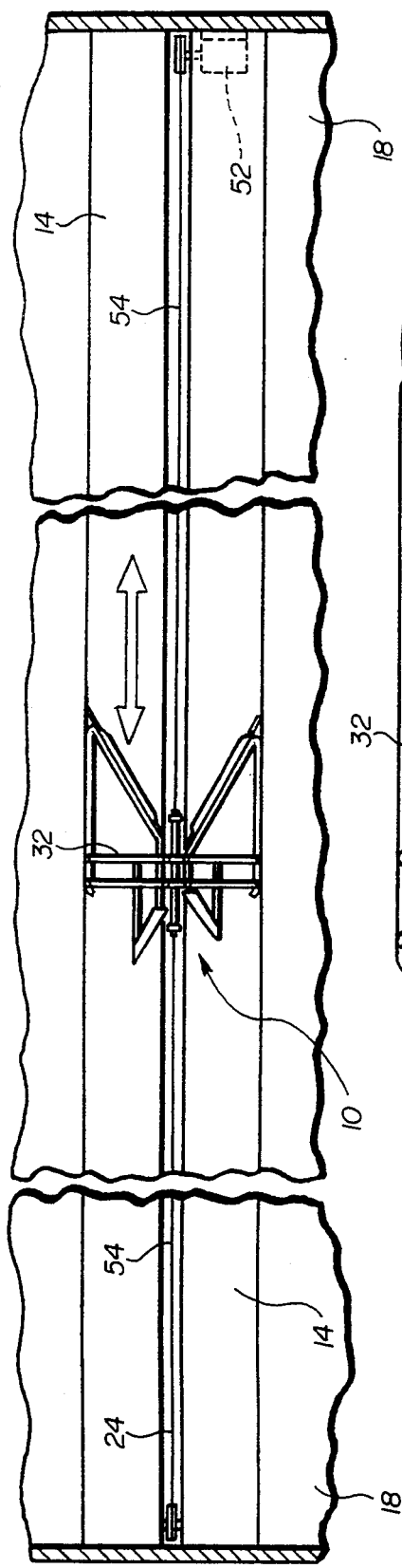
FIG. 2 is a plan view of the scraper assembly of the present invention.
Figure 3:
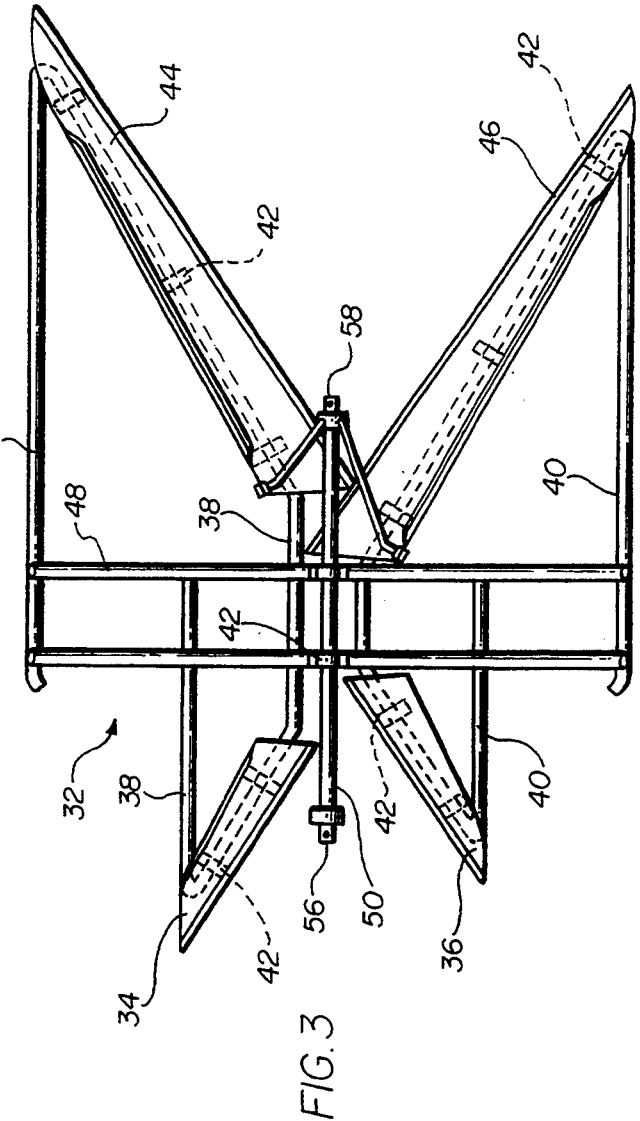
FIG. 3 is an isolated, enlarged plan view of the support frame and scraper blade components.

In accordance with one of the main features of the present invention, and referring initially to FIGS. 2 and 3, a scraper assembly 10 is provided for clearing manure 12 from the collection boards 14 and guiding it into the floor slot 24. The scraper apparatus 10 includes an adjustable support frame 32 having a first set of smaller blades 34, 36 pivotally mounted to support bars 38, 40, respectively, with brackets 42. The scraper apparatus 10 further comprises a second set of larger scraper blades 44, 46 also pivotally mounted to the support bars 38, 40, respectively, with brackets 42 as shown. Support bars 38 and 40 are joined together with a center brace 48 which has a pulley bar 50 rigidly attached to it between the support bars 38, 40 with brackets 42 to complete the support frame 32.

Still referring to FIGS. 2 and 3, the scraper apparatus 10 further includes a reversible driver 52, such as an electric motor, operatively coupled to a pulley cord 54 having one end thereof attached to a forward end 56 of the bar 50, and another end attached to a reverse end 58 of the pulley bar 50. It should therefore become apparent that the actuation of the driver 52 will cause the support frame 32 to advance or retreat along the length of the collection boards 14, as indicated by the double-arrow in FIG. 2, depending upon the direction in which the driver 52 is rotated.

Now referring to FIG. 4, the scraper assembly 10 as illustrated operating in a forward direction as indicted by the arrow in the lower-left portion. As the support frame 32 is advanced by the pulling force of the cord 54, smaller blades 34, 36 are pivoted to a substantially vertical position, generally perpendicular to the surfaces of the collection boards 14. The forward progression of the support frame 32 and the scraping contact between the blades 34, 36 and the boards 14 causes this substantially vertical orientation to be maintained at least until the movement of the support frame 32 is halted.

As illustrated, the smaller blades 34, 36 form a first scraping set, and each blade 34, 36 extends in a generally diagonal direction with respect to the lengthwise direction L of the collection board 14 upon with it travels. The generally diagonal direction of extension of blade 34 is substantially opposite to the generally diagonal extension of the blade 36, and both blades 34, 36 extend only approximately 30% of the width W of their respective collection boards 14 beginning at the floor slot 24. In addition, the blades 34, 36 are generally wedge-shaped in design to substantially conform with the down-sloped pitch (FIG. 1) of the collection boards 14 towards the slot 24.

Accordingly, as the support frame 32 advances in the forward direction along the collection boards 14, the smaller blades 34, 36 scrape and divert manure 14 into the floor slot 24, preferably at offset, spaced locations along the slot 24 as shown. As mentioned above, the blades 34, 36 span only approximately 30% of the width W of the boards 14 adjacent the slot 24. Due to the arrangement of the cages 20 above the boards 14, however, this 30% of the width W constitutes an area of concentrated manure build-up and operation of the scraper assembly 10 along the length of the collection boards 14 in the forward direction scrapes and clears approximately 50% of the entire manure deposits 12 thereon.

It should be noted that when the scraper assembly 10 is operated in the forward direction as illustrated in FIG. 4, a second scraping set of larger blades 44, 46 are pivoted away from a perpendicular orientation with the collection boards 14, and preferably are urged to maintain this non-perpendicular orientation by pivot rods 60 extending between the larger blades 44 and 46 and the pulley bar 50.

With reference now to FIG. 5, the scraper assembly 10 is shown in operation in a reverse direction as indicated by the arrow in the upper-right portion thereof. As the support frame 32 is retreating under the force of the pulley cord 54, the larger scraper blades 44, 46 which form the second scraper set are pivoted to a substantially vertical orientation, generally perpendicular to the collection boards 14, as a result of the scraping contact between the blades 44, 46 and the boards 14, and the reverse motion of the frame 32. Much like the operation of the smaller blades 34, 36, the larger blades 44, 46 maintain the substantially vertical orientation with respect to the collection boards 14 until the reverse motion of the support frame 32 is completed.

Also similar to the smaller blades 34, 36, the larger blades 44, 46 extend in a generally diagonal direction with respect to the lengthwise direction L of the collection board 14 upon which they respectively travel, and the generally diagonal direction of extension of blade 44 is substantially opposite to the generally diagonal extension of blade 46. Unlike the smaller blades 34, 36, however, the larger blades 44, 46, extend substantially the entire width W of their respective collection boards. Again, the blades 44, 46 are generally wedged-shaped in design to substantially conform with the down-sloped pitch of the collection boards 14 towards the slot 24.

Upon operation of the scraper assembly 10 in the reverse direction, the larger blades are pulled along the collection boards 14 during which time they scrape and divert manure from the entire width W of the boards into the floor slot 24 at offset locations therealong. Because this reverse trip takes place after the smaller blades 34, 36 have cleared approximately 50% of the manure on the collection boards 14 as discussed above, the larger blades 44, 46 can efficiently operate to clear the entire width W of the collection boards 14 as stated, without clogging the slot 24 above the accumulation pit 28. During the operation of the scraper assembly 10 in the reverse direction, the smaller set of blades 34, 36, are pivoted away from the substantially perpendicular orientation they assumed during the forward progression, as is shown in FIG. 5.

The invention is claimed as follows:

1. A scraper assembly for clearing manure deposits and other debris suitable for use with a collection board located beneath an animal cage arrangement, said scraper assembly comprising: a first scraper blade extending generally diagonally with respect to a substantially linear path of travel of said scraper assembly, but only partially across an entire width of clearance provided by said scraper assembly; a second scraper blade also extending generally diagonally with respect to the path of travel of the scraper assembly but opposite to the generally diagonal extension of said first blade, and across substantially the entire width of clearance provided by said scraper assembly; a support frame for maintaining said generally diagonal extensions of said first and second scraper blades; and, a driver connected to said support frame for initially advancing said scraper blades in a forward direction along said substantially linear path of travel during which time the first scraper blade clears deposits away from the path of travel of said scraper assembly, and for subsequently retreating said scraper blades in a reverse direction during which time said second scraper blade clears substantially the entire width of clearance provided by the scraper assembly.

2. The scraper assembly as recited in claim 1, wherein said first scraper blade is pivotally mounted on said support frame such that said first blade is pivoted so as to maintain a substantially perpendicular orientation when said assembly is driven in said forward direction, and such that said first blade is easily pivoted away from said substantially perpendicular orientation when said assembly is driven in said reverse direction.

3. The scraper assembly as recited in claim 1, wherein said second scraper blade is pivotally mounted to said support frame such that said second scraper blade is pivoted so as to maintain a substantially perpendicular orientation when said assembly is driven in said reverse direction, and such that said second blade is easily pivoted away from said substantially perpendicular orientation when said assembly is driven in said forward direction.

4. The scraper assembly as recited in claims 2 or 3, wherein said support frame further comprises pivot rod members for urging at least one of said first and second blades away from said substantially perpendicular orientation, said pivot rod members extending between said support frame and said scraper blade.

5. A scraper assembly as recited in claim 1, wherein two pairs of said first and second scraper blades are mounted on said support frame such that the first blades of each pair form a generally opposing first set of scraper blades, and the second pair of blades form a generally opposed second set of blades, and wherein said support frame is substantially centered over a slot extending between the lengths of two collection boards located beneath respective animal cage arrangements, each generally opposed set of scraper blades independently operating to clear manure from their respective collection boards into the slot separating the collection boards.

6. The scraper assembly as recited in claim 5, wherein the individual blades which form at least one of said generally opposed sets of blades are offset by a predetermined distance from one another in the direction of the path of travel such that each individual blade within an offset set of blades will operate to deposit manure into the slot extending between the collection boards at spaced locations.

7. A plurality of scraper assemblies for clearing manure deposits and other debris suitable for use with multiple collection boards located beneath multiple cage-tiers of an animal cage arrangement, each of said scraper assemblies comprising: a first scraper blade extending in a generally diagonal direction with respect to a substantially linear path of travel, but only partially across a clearance width created by the operation of each of said assemblies; a second scraper blade extending in a substantially opposite generally diagonal direction with respect to the generally diagonal extension of said first blade, and across substantially the entire clearance width; a support frame for maintaining said generally diagonal extensions of said first and second scraper blades; and, a driver connected to said support frame for initially advancing said scraper blades in a forward direction along the substantially linear path of travel during which time the first scraper blade clears deposits away from the path of travel, and for subsequently retreating said scraper blades in a reverse direction during which time said second scraper blade clears substantially the entire clearance width created by each of said assemblies.

* * * * *